United States Patent
Dai et al.

(10) Patent No.: US 7,552,144 B2
(45) Date of Patent: Jun. 23, 2009

(54) SYSTEM AND METHOD FOR CENTRAL REFRESH OF PLACE OBJECTS

(75) Inventors: Hong Dai, Westford, MA (US); Sami M. Shalabi, Arlington, MA (US); Charles R. Hill, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 10/334,296

(22) Filed: Dec. 31, 2002

(65) Prior Publication Data

US 2004/0128271 A1 Jul. 1, 2004

(51) Int. Cl.
*G06F 7/00* (2006.01)
(52) U.S. Cl. .................. 707/200; 707/201; 707/203; 709/217; 709/219
(58) Field of Classification Search ............... 709/205, 709/217, 219; 707/200, 201, 203
See application file for complete search history.

(56) References Cited

U.S. PATENT DOCUMENTS

| | | | | |
|---|---|---|---|---|
| 6,230,185 B1 * | 5/2001 | Salas et al. | ............... | 709/205 |
| 6,233,600 B1 * | 5/2001 | Salas et al. | ............... | 709/201 |
| 6,314,408 B1 * | 11/2001 | Salas et al. | ............... | 705/54 |
| 2002/0140730 A1 * | 10/2002 | Linsey et al. | ............... | 345/751 |

OTHER PUBLICATIONS

Book entitled "Customizing quickplace" by Nielson et al. on Dec. 22, 2000. (pp. 321-346).*
Article entitled "Going more (Quick) Places" by Hall dated Aug. 1, 2002.*
Article entitled "Ten things you need to know about deploying QuicPlace 3.0" by Hall dated Sep. 3, 2002.*
Article entitled "Comparing QuickPlace 3.0 with QuickPlace 2.0.8" by McCarrick et al. dated Sep. 3, 2002.*
Article entitled "New features in QuickPlace 3.0" by McCarrick dated Sep. 3, 2002.*
Article entitled "Going (Quick)Places with Charlie Hill" by Hall dated Jul. 1, 2002.*
Article entitled "Lotus Tries to Fend off Exchange" by Emigh dated Oct. 16, 2002.*
Article entitled Customizing Quickplace, by Nielson et al, dated Dec. 2000.*

* cited by examiner

*Primary Examiner*—Tim T Vo
*Assistant Examiner*—Mahesh H Dwivedi
(74) *Attorney, Agent, or Firm*—Holland & Knight LLP; Brian J Colandreo, Esq.

(57) ABSTRACT

A system for central refresh of a place includes a source place; a place type; a child place; each place comprising a plurality of place objects implemented as documents, logic, and associated design note, each design note including a plurality of items; some of the items being content items descriptive of content of the objects. A central refresh execution module determines whether an inherited place object is modified in a place by assigning to each item a sequence indicia indicative of change activity with respect to the item; generating and storing a stored checksum of sequence indicia generated for the content items; and responsive to a refresh operation with respect to the child place, and calculating a refresh checksum of sequence indicia for the content items. The central refresh execution module is responsive to the stored checksum and the refresh checksum being unequal for refreshing the child place.

31 Claims, 6 Drawing Sheets

| ITEM | CONTENT RELATED | SEQ # |
|---|---|---|
| $UpdatedBy | NO | 7 |
| Form | NO | 7 |
| h_Form | YES | 7 |
| h_IsInToc | NO | 7 |
| h_IsPublished | NO | 7 |
| h_IsSystem | NO | 7 |
| h_LastTimePutAway | NO | 7 |
| h_Name | YES | 8 |
| h_NameIsBanner | YES | 7 |
| h_Position | NO | 7 |
| h_Replaced | NO | 7 |
| h_SystemName | YES | 7 |
| h_Type | YES | 7 |
|  |  |  |
| h_SumItemSeqNums |  | 0#36 |

FIG. 5

SYSTEM AND METHOD FOR CENTRAL REFRESH OF PLACE OBJECTS

CROSS REFERENCES TO RELATED APPLICATIONS

Copending U.S. patent applications
Ser. No. 10/334,269, now U.S. Pat. No. 7,213,010, entitled "SYSTEM AND METHOD FOR THE AGGREGATION OF PLACE INFORMATION IN A MULTI-SERVER SYSTEM",
Ser. No. 10/334,261, now U.S. Pat. No. 6,904,439, entitled "SYSTEM AND METHOD FOR AGGREGATING USER PROJECT INFORMATION IN A MULTI-SERVER SYSTEM"; and
Ser. No.10/334,268, now U.S. Pat. No. 7,089,231, entitled "SYSTEM AND METHOD FOR SEARCHING A PLURALITY OF DATABASES DISTRIBUTED ACROSS A MULTI SERVER DOMAIN";

are assigned to the same assignee hereof and contain subject matter related, in certain respect, to the subject matter of the present application. The above identified patent applications are incorporated herein by reference.

BACKGROUND OF THE INVENTION

1. Technical Field of the Invention

This invention relates to updating child database design and data updates. More particularly, it relates to push/pull propagation of such updates from a source to a template, and from a template to child.

2. Background Art

A PlaceType is a mechanism for software reuse in the IBM Lotus QuickPlace® product. By it, a user may take a snapshot of a QuickPlace and make a template or PlaceType for other users to create new QuickPlaces. A PlaceType allows the user (administrator, author, etc.) to control the design logic and content of a child QuickPlace by refreshing it with changes made to its PlaceType.

Heretofore PlaceType follows a cookie-cutter model because of its limited refresh capability. There is a need in the art for a very flexible method for updating a software application design and its content and data, based on changes to its template.

The IBM Lotus Domino® product, a template is a skeleton that contains design elements, but no documents or content. When a template is used to create a database, the database receives the design elements from the template. Refreshing a design updates a database whose design is linked to a master template. In other words, Domino templating is only for design of databases, not for content.

In QuickPlace, PlaceType is a template that contains not only design but also logic and content. Refreshing a child place updates the design as well as logic and content of the place from its PlaceType.

In Domino, when an inherited design element is deleted from the database, its link to its template is lost. During subsequent refresh, this deleted design element will be copied back from the template to the database. There is no way to detect whether a design element, that exists in the template but not in the derived database, is a new design element or an already deleted element to the database.

In Domino, central refresh is a pull model. A design server task iterates through all server databases and pulls updates from its master template to each database.

The IBM Lotus Notes® replication push and pull model synchronizes source databases and their replicates across servers to distribute changes to Notes documents. On the other hand, PlaceType update requires a one-way, either push or pull, synchronization.

There is a need in the art for a very flexible method for updating a software application design and its content and data, based on changes to its template. There also is the need to provide for updating any structural, logical, or content items as needed, without the need to decide up front which items may be needed to be updated in the future.

OBJECTS AND SUMMARY OF THE INVENTION

It is an object of the invention to provide an improved system and method for refreshing child places with respect to their place types.

It is an object of the invention to provide a system and method for determining whether a place object that exists in a place type but not in a child place derived therefrom is new to the child place or deleted from the child place.

In accordance with a method of the preferred embodiments of the invention, central refresh of a place includes providing a place type as a template derived from a source place; deriving from the place type a least one child place; each child place including a plurality of objects implemented as documents, logic and design notes, the design notes including a plurality of items including a subset which are content items descriptive of content of the objects; determining whether an inherited place object is modified in a place by assigning to each item a sequence indicia indicative of change activity with respect to the item; generating and storing a stored checksum of sequence indicia generated for the content items; and responsive to a refresh operation with respect to a child place, calculating a refresh checksum of sequence indicia for the content items; and responsive to the stored checksum and refresh checksum being unequal, refreshing the child place.

A system for central refresh of a place in accordance with preferred embodiments of invention includes a source place; a place type; a child place; each place comprising a plurality of place objects, each place object implemented as a document, logic, and associated design note, each design note including a plurality of items; a subset of the items being content items descriptive of content of the objects; a central refresh execution module for determining whether an inherited place object is modified in a place by assigning to each item a sequence indicia indicative of change activity with respect to the item; generating and storing a stored checksum of sequence indicia generated for the content items; and responsive to a refresh operation with respect to the child place, calculating a refresh checksum of sequence indicia for the content items; and the central refresh execution module further responsive to the stored checksum and the refresh checksum being unequal for refreshing the child place.

In accordance with an aspect of the invention, there is provided a computer program product configured to be operable providing for central refresh of a place.

Other features and advantages of this invention will become apparent from the following detailed description of the presently preferred embodiment of the invention, taken in conjunction with the accompanying drawings.

BRIEF DESCRIPTION OF THE DRAWINGS

FIG. 5 is a diagrammatic illustration of a design note from FIG. 4, showing the check sum algorithm for identifying changes requiring update in accordance with the present invention.

BEST MODE FOR CARRYING OUT THE INVENTION

In accordance with the preferred embodiments of the invention, a central refresh method includes procedures for detecting whether an inherited place object has been modified by a user and for distinguishing whether that change is related to the design or the content of the object. Central refresh of all places that are based on a given PlaceType is provided. All design, logic and content changes in the source place can be pushed to all of its child places in a single operation through this central refresh mechanism. Two levels of central refresh are provided: refresh and replace, and forced refresh.

A very flexible method for updating a software application design and its content and data is based on changes to its template. In addition, the template can be updated from a prototype source application thus supporting the concept of prototype-based inheritance in which the template is modified indirectly by modifying its source instance. A designer of an application is enabled to decide which items are updated and which are not, without having to formally mark items as design elements and content elements. An advantage of this approach is that any structural, logical, or content items can be updated as needed, without the need to decide ab initio which items may be needed to be updated in the future. By corollary, the refresh mechanism of the preferred embodiments of the invention is complete enough that it makes possible content-push applications as well as traditional template updates. In other words, the mechanism is equally useful for pushing content as it is for upgrading design elements in an application.

Central refresh has both push and pull models, and can either push the updates from a specified PlaceType to all of its child places, or pull updates to specified child places from their PlaceTypes. Thus, either the target or the source is specified for refresh.

Figure 1:
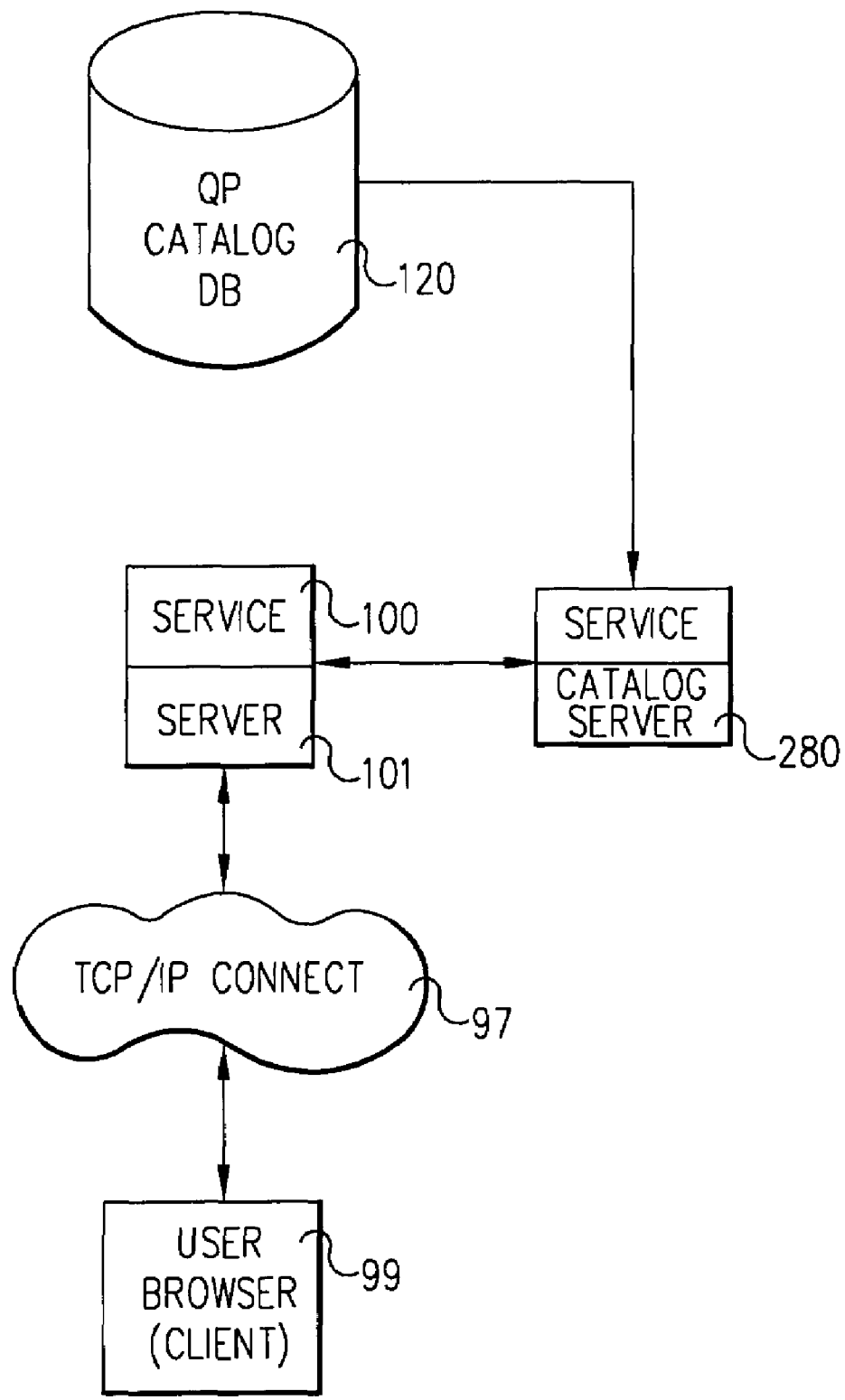
FIG. 1 is a high level system diagram illustrating a typical system configuration in accordance with the preferred embodiment of the invention.
Figure 2:
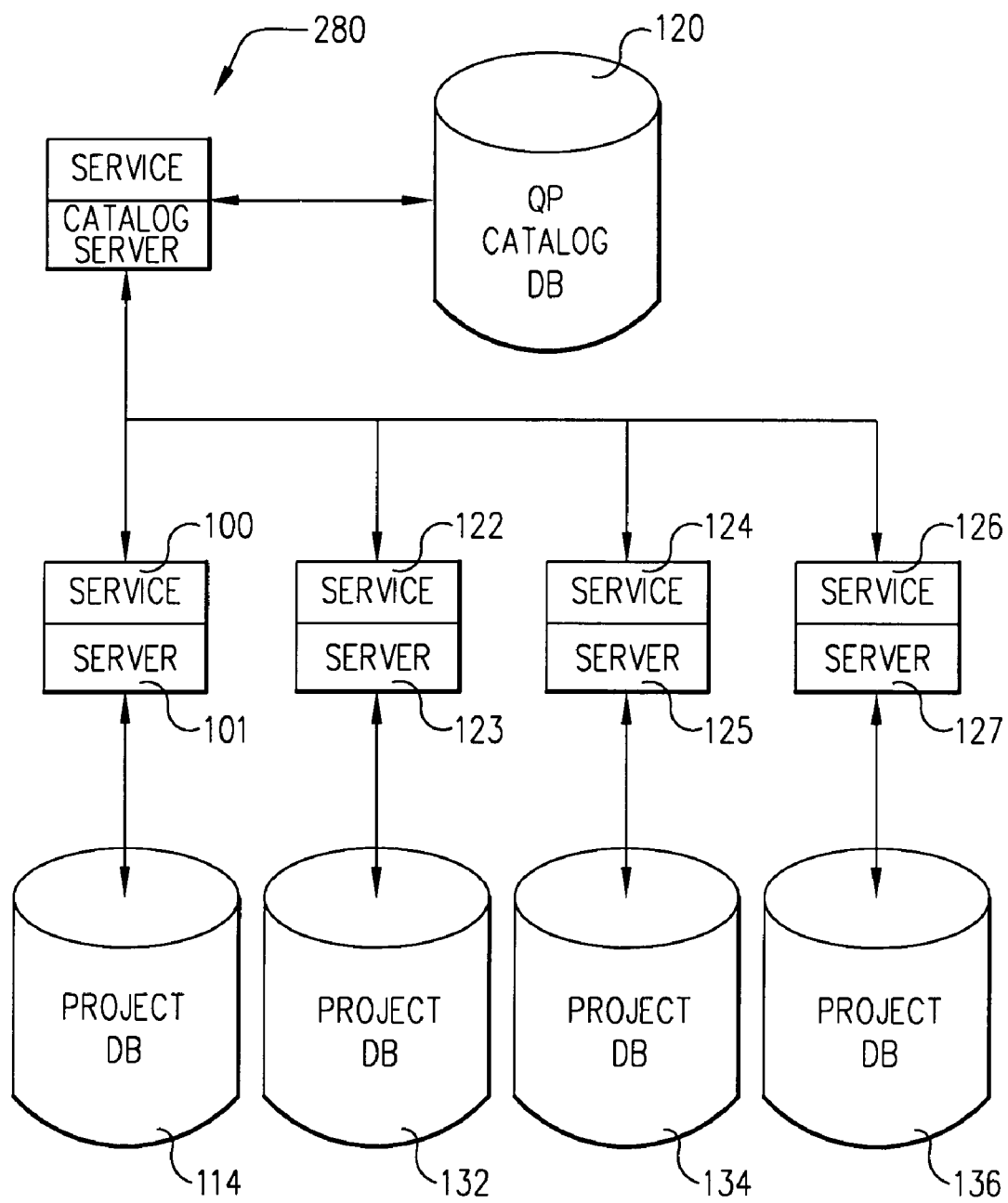
FIG. 2 is a high level system diagram illustrating a typical multi-server system environment.

Referring to FIGS. 1 and 2, catalog 120 is a database, such as a QuickPlace catalog, for aggregating information about projects, such as QuickPlaces 114, 132, 134, 136, in a multi-server system environment, including service 100/server 101, 122/123, 124/125, and 126/127, communications link 97, and one or more client terminals, such as user browsers 99. Host catalog server 280 is a Domino server with QuickPlace installed which has been configured to host catalog database 120 and which is accessible to QuickPlace servers 101 in an enterprise through the IBM® Lotus® Notes® RPC (tcp port 1352) and http protocols.

Throughout this specification, the generic term "project" and more specific terms "place" or "QuickPlace" are used substantially interchangeably. Place and QuickPlace, terms used primarily in connection with the IBM Lotus Quick-Place® and Domino® products, are specific examples of projects. "Places", and as used herein "projects", are databases or other entities containing data to which access is controlled, such as by access control lists. Similarly, "Place-Type" is a term used in QuickPlace technology for templates of child places derived from source places, and the term "place type" is used to designate templates which, while not limited to QuickPlace technology share PlaceType characteristics such as inheritance and access control. Unless specifically designated as limited to QuickPlace technology, the term "PlaceType" is also intended to be equivalent to the term "place type", as defined above.

The functionality available to each user via remote terminals 99 may be customized in accordance with the needs and authorization of the user and/or entity. Terminals 99 may access the system using, for example, browser software technology or other electronic accessing methods as my be known to one of skill in the art. Reports and other information displayed to the end user at terminal 99 may be displayed using known web page formatting techniques.

Communication link 97 links remote terminals 99 to server 101. Link 97 may be a hardwired link, such as a telephone line, coaxial cable, digital data line, or the like, or a wireless link such as a radio frequency or infrared communications link, or the like.

As illustrated in FIG. 1, a QuickPlace service 100 represents a group a servers that are able to communicate with each other through a network, and work together to provide function (such as project creation, search across projects and servers, and get aggregate view across all servers and projects) In a preferred embodiment, this service is implemented in an abstract sense, in that each server 100 implements a notion of service, which in this sense is a multi-server deployment of QuickPlace servers 101 that can be treated as a consistent unit of service for administration and in the user interface.

A QuickPlace service 100 comprises multiple QuickPlace servers 101 and/or QuickPlace clusters, which: (1) are in the same Domino certifier; (2) share the same user directory and authentication system; (3) are on the same user network (i.e., are not separated by a firewall); and (4) are administered by the same administration team. These constraints are enough to ensure across the service that: (1) servers 101 can be configured consistently; (2) servers 101 can communicate and share data with each other; (3) user identities are in the same name space and do not collide; and (4) single sign on authentication can be implemented.

Figure 3:
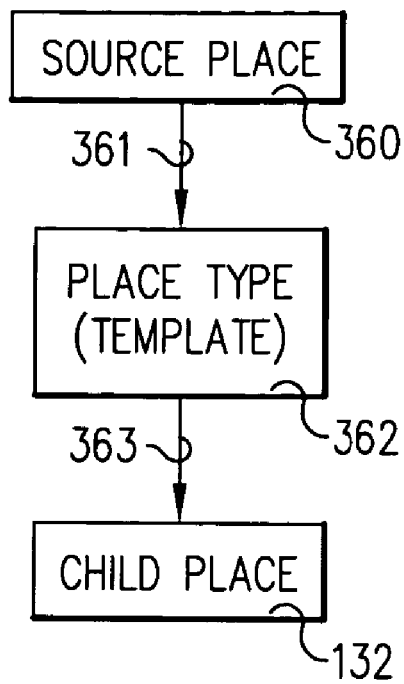
FIG. 3 is a diagrammatic illustration of a PlaceType, its source place and child place.

Referring to FIG. 3, a PlaceType 362 is derived from a source place 360 for use as a template in creating child places 132.

Figure 4:
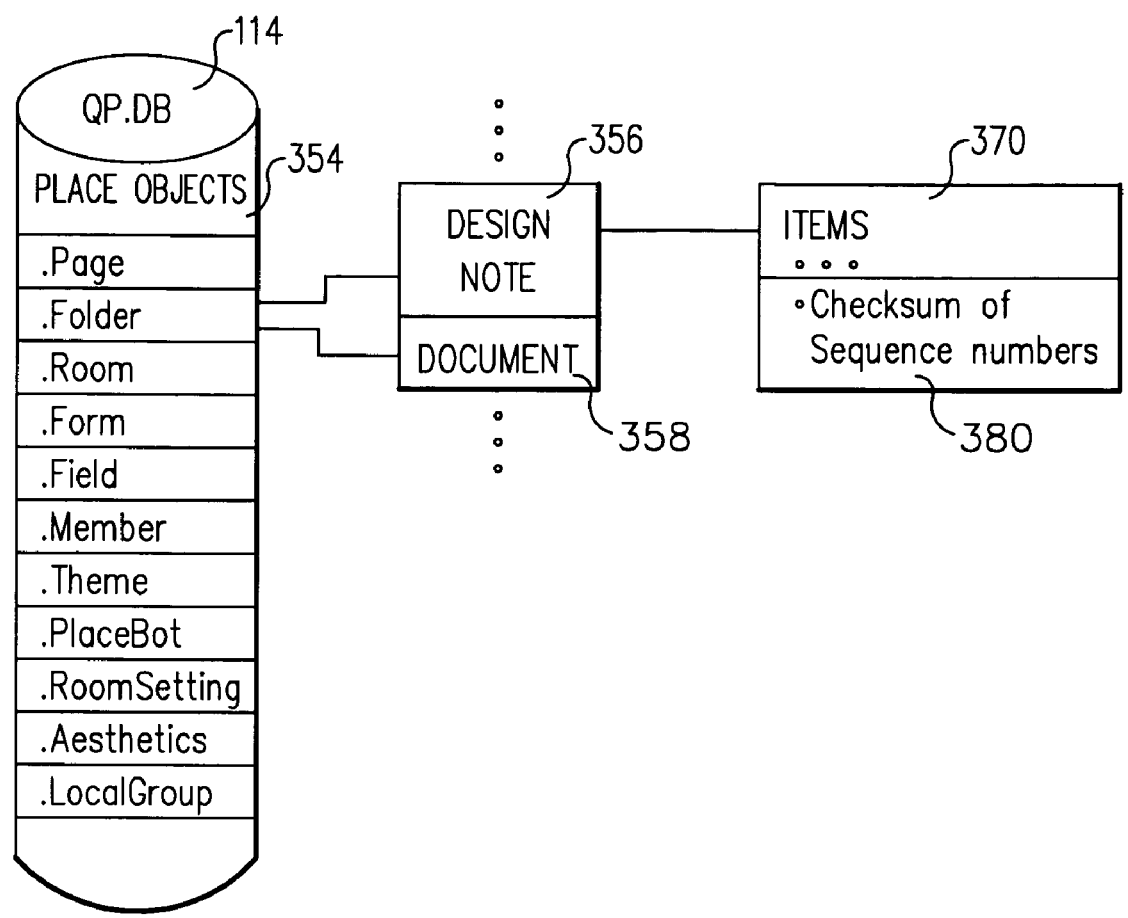
FIG. 4 is a diagrammatic illustration of place objects.

Referring to FIG. 4, objects 354 in a QuickPlace database QP.DB 114 include .Page, .Folder, .Room, .Form, .Field, .Member, .Theme, .PlaceBot, .RoomSetting, .Aesthetics, and .LocalGroup. These objects 354 form the structure and logic of a QuickPlace, and they also contain the content of a place. Logic is also a place object. An object is implemented as a document 358 together with a design note 356 which includes several items and, in accordance with the present invention, a checksum of sequence numbers assigned to content related items in the list of items 370.

Central refresh provides service provider administrators a robust and easy way to control, track, maintain and synchronize QuickPlace 114 changes in a structured way. End-users will experience more complete application updates triggered by the service provider administrator.

When a central refresh command (push model) is executed on a QuickPlace server, for example, load qptool refresh -a to refresh all places 132 created from a PlaceType 362, or load qptool refresh -s<PlaceType Name> to refresh all places 132 created from the given PlaceType 362, the QuickPlace (QP) server iterates through all the places 132 on the server, and opens the PlaceType stamp note in each place. A PlaceType stamp note includes a refresh time stamp and, if the place 132 is created from a PlaceType 362, the PlaceType name.

When central refresh command (pull model) is executed on a QP server, for example, load qptool refresh -p "child place" (or qptool refresh -a), the QuickPlace server specifies the target for refresh and will update the specified place from its PlaceType.

Depending upon command options to be described hereafter, it is next determined if this place is one of the places to be refreshed. For example, if the PlaceType name in the PlaceType stamp note is the same as the one given in the refresh comand (-s<PlaceType Name>), then this is one of the places to refresh.

Template, or PlaceType 362, can be updated with changes in the source QuickPlace 360, and those changes can be propagated to child places 132 according to a central push model. Individual dependent child places 132 may also update their design, logic and content with the PlaceType 362 according to a pull model.

When refreshing a place 132, the QP server iterates through all the objects 354 contained in the place and refreshes all the objects inherited from its PlaceType 362. Objects 354 that are created in the child place 132 by the user are not touched. The result of refresh depends on the state of the object 354 and the level of refresh. Table 1 specifies what happens to a place object 354 after basic refresh. Table 2 specifies what happens to a place object 354 after replace. Place objects 354 which are members and groups are exceptions. Membership can be inherited but never refreshed for security reasons.

TABLE 1

WHAT HAPPENS TO A PLACE OBJECT AFTER BASIC REFRESH

|  | Not changed in place | Changed in Place | Deleted in Place |
| --- | --- | --- | --- |
| Object Not Changed in PlaceType* | No change | No change | No change |
| Object Changed in PlaceType* | Updated | No change | No change |
| Object Deleted in PlaceType* | Deleted | No change | No change |

TABLE 2

WHAT HAPPENS TO A PLACE OBJECT AFTER REPLACE

|  | Not changed in place | Changed in Place | Deleted in Place |
| --- | --- | --- | --- |
| Object Not Changed in PlaceType* | No change | Updated | Copied back |
| Object Changed in PlaceType* | Updated | Updated | Copied back |
| Object Deleted in PlaceType* | Deleted | Deleted | No change |

In order to achieve the central refresh design specified in Tables 1 and 2, it is necessary to determine:

1. whether a place object 354 is inherited from its PlaceType 362 or created in the child place 132 by a place user;
2. whether an inherited place object 354 is modified in a place 132; and
3. whether a place object 354 which exists in a source place 360, but not in a child place 132, is new to the child place or is deleted in the child place by the place user.

Determining Whether a Place Object is Inherited or Created

When a place 132 is created from a PlaceType 362, a replaced indicia, such as "h_Replaced", is added to all object notes 356 and used to label inherited objects 354 and detect whether the source object in PlaceType 362 has changed since the last refresh. An object 354 that has a "h_Replaced" 391 item in its notes 356 is an inherited object, otherwise it is a local object that has been created in the child place 132 by the place user. "h_Replaced" 391 is a time stamp that records last refresh/replace time of each note. "h_Replaced 391 is set to the last modified date of its source note(s) 356 in PlaceType 362 after each refresh. This may then be used to detect if the source object 354 has changed since the last refresh.

Determining Whether an Inherited Place Object is Modified in a Place

Referring to FIGS. 5 and 4, when an object 354 is modified in a child place 132, the last modified date(s) of its note(s) 356 changes and therefore the date(s) will be different from the date(s) of the same object 354 in its PlaceType 363. However, just comparing last modified date(s) is not sufficient to determine whether the object 354 is indeed changed in terms of logic and content. For example, when the position of a folder in the table of contents (TOC) is reordered, or a page is opened and the action directed to the page canceled without being saved, the last modified date of the folder document note or the page note changes, but there has been no change made to the folder or page logic and content.

To deal with this situation, in accordance with the preferred embodiments of the invention, a checksum mechanism is provided for detecting whether a place object 354 is changed in terms of QP content. This mechanism includes a "h_SumItemSeqNums" item 380 in object notes 370 for recording the sum of the sequence numbers 374 of all items 376 in the note 370 that are content-related 372. In the example of FIG. 5, for a document note 370 of a QuickPlace object 354 .Page those items 376 which are content related include h_Form 383, h_Name 388, h_NameIsBanner 389, h_SystemName 392, and h_Type 393; and those which are not content related include $UpdatedBy 381, form 382, h_IsInToc 384, h_IsPublished 385, h_IsSystem 386, h_LastTimePutAway 387, h_Position 390, and h_Replaced 391.

The checksum value 380 is calculated and updated each time the note is refreshed. When a note is modified, depending on the modification, corresponding items will be touched and their sequence number 374 will be incremented by 1. Therefore, by comparing the checksum value 380 with the current sum of sequence number 374 of the content-related items, whether the note is changed since last refresh may be determined.

Those items 376 that are excluded from the sum of item sequence numbers 374 are the non-content related items. For example, h_Position stores the position of a page in the QP sidebar. A change in the position is not considered to represent a change of page content. The example of FIG. 5 illustrates the calculation of the check sum 380.

In order to version the check sum algorithm used, in computing a check sum 380, the algorithm is given a version number and the version number is built into the value for check sum 380, delimited in this example by the "#" symbol. This versioning accommodates changes in the algorithm (such as the addition of a new item 376 or change in status of an existing item 376 from content related to not content related, or visa versa) used to compute check sum 380.

Determining Whether a Place Object That Exists in Source Place, But Not in Child Place, Is New to the Child Place, Or is Deleted in Child Place by Place User An object 354 that only exists in PlaceType 362 but not in child place 132 could mean two things: (1) object 354 is newly added to PlaceType 362 and needs to be added to child place 132 during refresh; or (2) object 354 is not new but is deleted from child place 132 by place user and should not be added back to child place 132 if the refresh is basic refresh (first level of refresh). To detect which case, the creation date of object 354 is compared with the refresh date of the place which is stored in the PlaceType Stamp. If the creation date is earlier, it means the object is not new, otherwise it is a new object to the child place.

Push, Pull and Clusters

Figure 6:
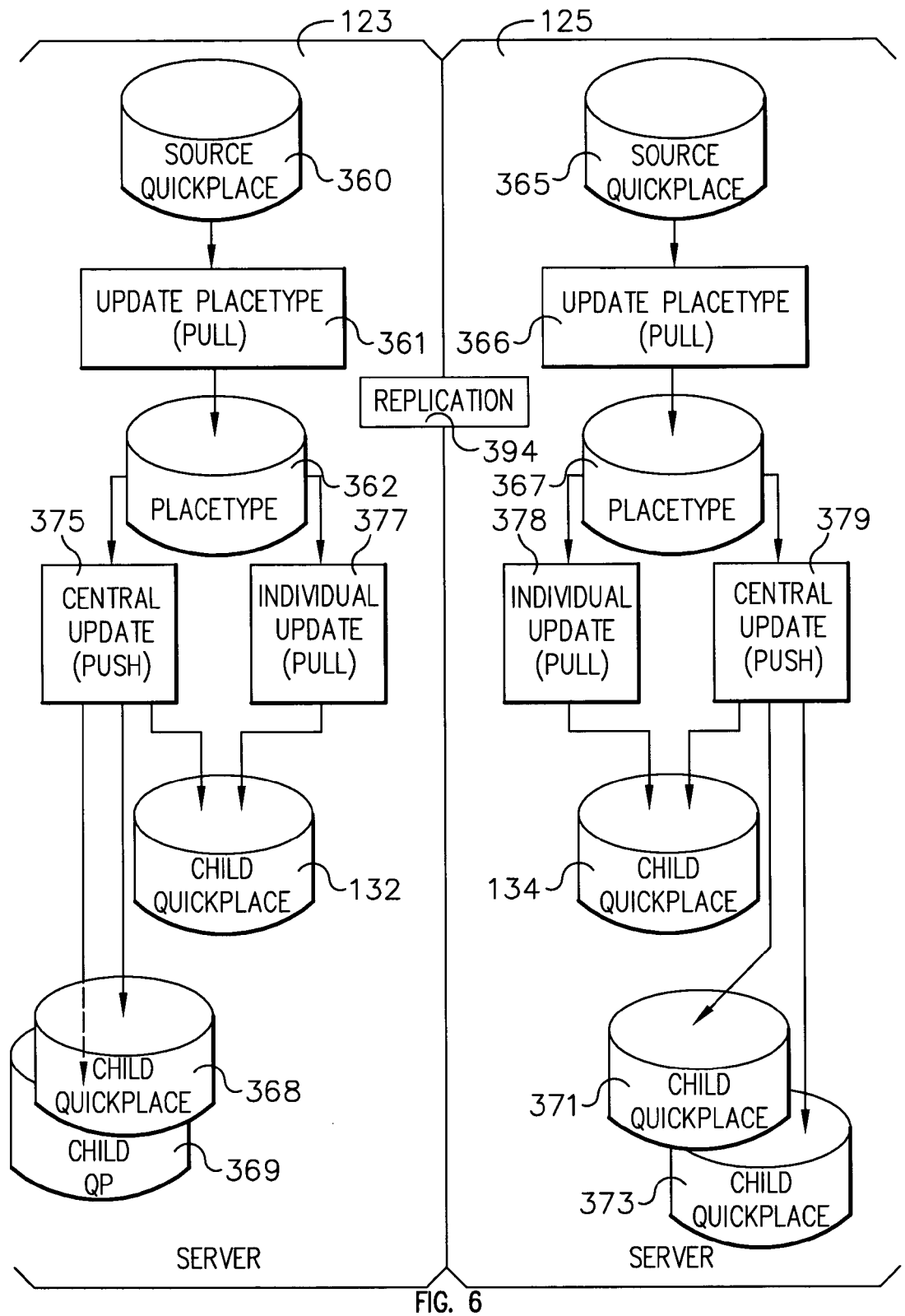
FIG. 6 is a high level system diagram illustrating push/pull updating of places in a multi-server environment.

Referring to FIG. 6, QuickPlace servers 123, 125 serve source QuickPlaces 360, 365, PlaceType 362, 367 and child QuickPlaces 132, 368, 369, 134, 371 and 373, respectively.

In accordance with the pull model, PlaceType 362 is synchronized to source QuickPlace 360 changes by an administrator who manages PlaceTypes pull updates 361 from its source QuickPlace 360 to a PlaceType 360. Source QuickPlace 360 and its PlaceType 362 need to reside on the same server 123. A QuickPlace user can also update 377 his individual QuickPlace 132 with its PlaceType 362 on same server 123.

In accordance with the central refresh push model, a server administrator can update the entire set of dependent QuickPlaces 132, 368, 369 on same server 123 with a single operation 375 by which changes are pushed from a PlaceType 362 to all of its dependent QuickPlaces. This opeartion may be a nightly server task and could be done on all QuickPlaces 132, 368, 369 as well as just on selected QuickPlaces.

A typical QuickPlace cluster includes a load balancer server, a plurality of other servers, and project databases. A project cluster is treated as a single virtual server in the service model.

In a clustered environment, QuickPlace changes are distributed as follows. First, PlaceType 362 pulls updates from its source QuickPlace 360 on server 123. Second, PlaceType 362 changes are centrally pushed 375 to its dependent QuickPlaces 132, 368, 369 on server 123. Third, all the QuickPlaces 360, 362, 132, 368 and 369 are replicated to server 125 through replication 394. PlaceType replica 367 should be present on every server 125 so that each dependent QuickPlace 134, 371, 373 on that server 125 can pull updates 378 from its PlaceType 367.

A PlaceType 362 is a snapshot of its source QuickPlace 360. When a PlaceType 362 is updated with changes in its source QuickPlace 360, it is made identical to its source QuickPlace. PlaceType update is a replace model.

Dependent QuickPlaces are updated either as a refresh or a replace model.

The rules of refresh/replace are:
(1) For refresh, all inherited objects 354 that have not been modified in the target QuickPlace 132 should be made identical to its source PlaceType 362. New objects 354 from PlaceType 362 are added to child QuickPlace 132. Modified objects 354 remain unchanged in QuicpPlace 132. Deleted objects in QuickkPlace will come back if they have changed in PlaceType 362.
(2) For replace, QuickPlace 132 is made identical to PlaceType 362 except local objects 354.
(3) Local objects 354 are never touched during refresh/replace.

For cascading update, creating and replacing a PlaceType 362 from a source QuickPlace 360 is exactly the same as that of creating and replacing a dependent QuickPlace 132 from a PlaceType 362, except that because a PlaceType 362 never adds local objects, the result of replace is a completely identical QuickPlace 363 to its source QuickPlace 360.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for central refresh of a place, comprising:
providing a place type as a template derived from design elements and content elements of a source place;
deriving from said place type a least one child place;
each said child place including a plurality of objects implemented as documents, logic and design notes, said design notes including a plurality of items including a first selected subset of said items which are content items descriptive of content of said objects and a second subset which are descriptive of non-content items;
determining whether an inherited place object is modified in a place by
assigning to each of said plurality of items in said first selected subset and said second subset a sequence indicia indicative of change activity with respect to said item;
generating and storing a stored checksum of sequence indicia generated for only said first selected subset of content items; and
responsive to a refresh operation with respect to said child place, calculating a refresh checksum of sequence indicia for only said content items; and
responsive to said stored checksum and said refresh checksum being unequal, refreshing said child place.

2. The method of claim 1, further comprising:
associating algorithm version indicia with each of said refresh checksum and said stored checksum;
responsive to said algorithm version indicia being unequal for said refresh checksum and said stored checksum, adapting comparison of said refresh checksum and said stored checksum to differences in associated algorithms.

3. The method of claim 1, further comprising incrementing item sequence numbers and recalculating and updating said stored checksum each time said design note is refreshed.

4. The method of claim 3, further comprising executing a hierarchical inheritance process by:
selectively pulling updates from said source place to said place type and pulling updates from said place type to said child place; and
pushing updates from said place type selectively to all or specified said child places residing on a same server with said place type.

5. The method of claim 3, said refreshing further comprising iterating through all objects contained in said child place and refreshing all the objects inherited from said place type while not refreshing objects created and modified in said child place by a user.

6. The method of claim 5, said refreshing further comprising not refreshing objects which are members and groups.

7. The method of claim 5, further comprising:
determining whether a place object is inherited from its place type or created in said child place by a place user;
determining whether an inherited place object is modified in a place;
determining whether a place object which exists in said source place, but not in said child place, is new to said child place or is deleted in said child place by said place user;
executing a central refresh process as selectively choosing either a basic refresh or a replace process with respect to place objects:
wherein choosing a basic refresh process comprises updating and deleting only place objects not previously changed in said place which have been changed or deleted in its corresponding place type, and leaving unchanged all other place objects; and
wherein choosing a replace process comprises leaving objects unchanged for objects not changed in place or in place type and objects deleted from both place and place type, updating objects changed in place whether or not changed in place type, updating objects changed in place type and not changed in place, for objects deleted in place copying back objects from place type whether or not changed, deleting objects from place which have been deleted from place type.

8. The method of claim 7, said determining whether a place object is inherited from its place type or created in said child place by a place user comprising:
appending replaced indicia to object notes used to label inherited objects; and
during refresh, identifying objects not having said replaced indicia as local objects which have been created in said child place by said place user.

9. The method of claim 8, said replaced indicia being a time stamp that records last refresh/replace time of each said note; and determining with reference to said last refresh/replace time whether a source object has changed since a last refresh.

10. The method of claim 9, said determining whether a place object which exists in said source place, but not in said child place, is new to said child place or is deleted in said child place by said place user comprising:
comparing a creation date of place object with a refresh date of said place stored in a place type stamp;
responsive to said creation date not being earlier than said refresh date, adding said new object to said child place; and
responsive to said creation date being earlier than said refresh date, for basic refresh not adding said new object to said child place.

11. The method of claim 1, further comprising distributing quick place changes in a clustered environment by:
on a first server, pulling updates from a source place to its corresponding place type;
on said first server, centrally pushing place type updates from said place type to its dependent child places on said first server; and
replicating said place type, said source place, and said child places on said first server to a second server in a cluster including said first server.

12. The method of claim 11, further comprising pulling updates to child places on said second server from a place type replica on said second server of a place type on said first server.

13. A system for central refresh of a place, comprising:
a source place;
a place type derived from design elements and content elements of said source place;
a child place;
each said place comprising a plurality of place objects, each said place object implemented as a document, logic and associated design note, each said design note including a plurality of items; a first subset of said items being content items descriptive of content of said objects and a second subset of said items being non-content items;
a central refresh execution module for determining whether an inherited place object is modified in a place by
assigning to each of said plurality of items a sequence indicia indicative of change activity with respect to said item;
generating and storing a stored checksum of sequence indicia generated only for said first subset of items which are content items, and not for said non-content items; and
responsive to a refresh operation with respect to said child place, calculating a refresh checksum of sequence indicia for said content items; and
said central refresh execution module further responsive to said stored checksum and said refresh checksum being unequal for refreshing said child place.

14. The system of claim 13, said central refresh execution module further for:
- determining whether a place object is inherited from its place type or created in said child place by a place user;
- determining whether an inherited place object is modified in a place;
- determining whether a place object which exists in said source place, but not in said child place, is new to said child place or is deleted in said child place by said place user;
- executing a central refresh process as selectively choosing either a basic refresh or a replace process with respect to place objects:
  - wherein choosing a basic refresh process comprises updating and deleting only place objects not previously changed in said place which have been changed or deleted in its corresponding place type, and leaving unchanged all other place objects; and
  - wherein choosing a replace process comprises leaving objects unchanged for objects not changed in place or in place type and objects deleted from both place and place type, updating objects changed in place whether or not changed in place type, updating objects changed in place type and not changed in place, for objects deleted in place copying back objects from place type whether or not changed, deleting objects from place which have been deleted from place type.

15. The system of claim 14, said central refresh execution module further for determining whether a place object is inherited from its place type or created in said child place by a place user by:
- appending replaced indicia to object notes used to label inherited objects; and
- during refresh, identifying objects not having said replaced indicia as local objects which have been created in said child place by said place user.

16. The system of claim 15, said replaced indicia being a time stamp that records last refresh/replace time of each said note; and said central refresh execution module further for determining with reference to said last refresh/replace time if a source object has changed since a last refresh.

17. The system of claim 16, said central refresh execution module determining whether a place object which exists in said source place, but not in said child place, is new to said child place or is deleted in said child place by said place user by:
- comparing a creation date of place object with a refresh date of said place stored in a place type stamp;
- responsive to said creation date not being earlier than said refresh date, adding said new object to said child place; and
- responsive to said creation date being earlier than said refresh date, for basic refresh not adding said new object to said child place.

18. The system of claim 13, said central refresh execution module further for distributing quick place changes in a clustered environment by:
- on a first server, pulling updates from a source place to its corresponding place type;
- on said first server, centrally pushing place type updates from said place type to its dependent child places on said first server; and
- replicating said places on said first server to a second server in a cluster including said first server.

19. A storage medium readable by a machine, embodying a program of instructions executable by a machine to perform method steps for central refresh of a place, said method comprising:
- providing a place type as a template derived from design elements and content elements of a source place;
- deriving from said place type a least one child place;
- each said child place including a plurality of objects implemented as documents, logic and design notes, said design notes including a plurality of items including a first subset of said items which are content items descriptive of content of said objects and a second subset of said items which are non-content items;
- determining whether an inherited place object is modified in a place by
  - assigning to each of said plurality of items a sequence indicia indicative of change activity with respect to said item;
  - generating and storing a stored checksum of sequence indicia generated only for said first subset of said items which are content items; and
  - responsive to a refresh operation with respect to said child place, calculating a refresh checksum of sequence indicia for said content items; and
- responsive to said stored checksum and said refresh checksum being unequal, refreshing said child place.

20. The storage medium of claim 19, said method further comprising:
- associating algorithm version indicia with each of said refresh checksum and said stored checksum;
- responsive to said version indicia being unequal, adapting comparison of said refresh checksum and said stored checksum to differences in associated algorithms.

21. The storage medium of claim 19, said method further comprising incrementing item sequence numbers and recalculating and updating said stored checksum each time said note is refreshed.

22. The storage medium of claim 21, said method further comprising:
- executing a hierarchical inheritance process by selectively pulling updates from said source place to said place type and pulling updates from said place type to said child place, and pushing updates from said place type selectively to all or specified child places residing on a same server with said place type.

23. The storage medium of claim 21, said refreshing further comprising iterating through all objects contained in said child place and refreshing all the objects inherited from said place type while not refreshing objects created in said child place by a user.

24. The storage medium of claim 23, said refreshing further comprising not refreshing objects which are members and groups.

25. The storage medium of claim 23, said method further comprising
- determining whether a place object is inherited from its place type or created in said child place by a place user;
- determining whether an inherited place object is modified in a place;
- determining whether a place object which exists in said source place, but not in said child place, is new to said child place or is deleted in said child place by said place user;
- executing a central refresh process as selectively choosing either a basic refresh or a replace process with respect to place objects:

wherein choosing a basic refresh process comprises updating and deleting only place objects not previously changed in said place which have been changed or deleted in its corresponding place type, and leaving unchanged all other place objects; and wherein choosing a replace process comprises leaving objects unchanged for objects not changed in place or in place type and objects deleted from both place and place type, updating objects changed in place whether or not changed in place type, updating objects changed in place type and not changed in place, for objects deleted in place copying back objects from place type whether or not changed, deleting objects from place which have been deleted from place type.

26. The storage medium of claim 25, said determining whether a place object is inherited from its place type or created in said child place by a place user comprising:

appending replaced indicia to object notes used to label inherited objects; and during refresh, identifying objects not having said replaced indicia as local objects which have been created in said child place by said place user.

27. The storage medium of claim 26, said replaced indicia being a time stamp that records last refresh/replace time of each said note; and said method further comprising determining with reference to said last refresh/replace, time whether a source object has changed since a last refresh.

28. The storage medium of claim 26, said determining whether a place object which exists in said source place, but not in said child place, is new to said child place or is deleted in said child place by said place user comprising:

comparing a creation date of place object with a refresh date of said place stored in a place type stamp;

responsive to said creation date not being earlier than said refresh date, adding said new object to said child place; and responsive to said creation date being earlier than said refresh date, for basic refresh not adding said new object to said child place.

29. The storage medium of claim 19, said method further comprising distributing quick place changes in a clustered environment by:

on a first server, pulling updates from a source place to its corresponding place type;

on said first server, centrally pushing place type updates from said place type to its dependent child places on said first server; and replicating said places on said first server to a second server in a cluster including said first server.

30. The storage medium of claim 29, said method further comprising pulling updates to child places on said second server from a place type replica on said second server of a place type on said first server.

31. A computer program product, residing on a computer readable storage medium, for central refresh of a place according to the method comprising:

providing a place type as a template derived from design elements and content elements of a source place;

deriving from said place type a least one child place;

each said child place including a plurality of objects implemented as documents, logic and design notes, said design notes including a plurality of items including a first subset of said items which are content items descriptive of content of said objects and a second subset of said items which are non-content items;

determining whether an inherited place object is modified in a place by assigning to each of said plurality of items a sequence indicia indicative of change activity with respect to said item;

generating and storing a stored checksum of sequence indicia generated only for said first subset of items which are content items; and responsive to a refresh operation with respect to said child place, calculating a refresh checksum of sequence indicia for said content items; and responsive to said stored checksum and said refresh checksum being unequal, refreshing said child place.

* * * * *